Patented Aug. 5, 1952

2,606,181

UNITED STATES PATENT OFFICE 2,606,181

LACTALBUMIN OF IMPROVED TASTE FOR HUMAN CONSUMPTION

William J. Pratt, Belle Center, Ohio, and Frank H. Tinkler, Mason, Mich., assignors to Wyeth Incorporated, Philadelphia, Pa., a corporation of Delaware No Drawing. Application November 8, 1949, Serial No. 126,236

4 Claims. (Cl. 260—122)

This invention relates to a process of preparing lactalbumin of improved taste for human consumption by precipitating lactalbumin from whey after pretreating the whey to remove impurities having objectionable taste characteristics.

Whey produced in cheese making or casein manufacture contains a considerable amount of lactose and a smaller amount of nutritious proteins collectively called lactalbumin by milk technologists. In the commercial recovery of lactose the lactalbumin is usually precipitated at some stage of the process. In a commonly used process, for example, whey is separated from any residual casein curd by straining, run through a cream separator to remove residual butter fat, adjusted to a pH of 4.5–4.6, heated to 200°–205° F., and allowed to stand. Coagulated lactalbumin settles and the supernatant liquor is concentrated and cooled to cause crystallization of lactose which is separated and recovered.

Lactalbumin precipitated in this way has a high nutritive value but is unacceptable for human consumption because of its objectionable taste, which is fatty, slightly cheesy and somewhat bitter. The product is unsuitable for preparation of protein hydrolysates. After proteolytic hydrolysis with pancreatic enzymes the objectionable taste is increased.

Another objection to the conventional method of recovering lactalbumin and to the recovered product is that it has proved difficult or impossible to filter the coagulated lactalbumin without the addition of a filter aid, which necessarily remains in the recovered product.

It is an object of this invention to provide a simple and economical process for recovering from whey a lactalbumin composition free of the impurities causing the disagreeable taste, and to accomplish this without introducing into the lactalbumin any undesirable or non-comestible materials such as filter aids or other foreign substances. The resulting lactalbumin is thus acceptable in taste and composition for human consumption and is suitable for the preparation of protein hydrolysates for human use.

We have discovered that the undesirable taste in the ordinary lactalbumin coagulum is apparently due to a casein-lipid complex, not removable by a cream separator, which is precipitated with the lactalbumin. The complex is composed of approximately 75% protein and 25% ether-soluble lipids. We have not determined whether the complex is a physical aggregation or whether chemical combination is involved.

Whey prepared in the usual way described above, i. e. by separating from residual curd and passage through a cream separator, still contains colloidal casein-lipid complexes. These colloidal materials, undesirable from the taste standpoint, are adsorbed to the lactalbumin coagulum when the latter is precipitated. Lactalbumin thus precipitated, though non-toxic and highly nutritious, is difficult or impossible to isolate without addition of filter-aid and is ordinarily used only in stock and poultry feeds because of its taste.

We have further discovered that these undesirable impurities may be removed from the whey by a simple pretreatment just before the lactalbumin precipitation. This treatment involves adjusting the pH of the whey as usual to close to the casein isoelectric point by adding a controlled amount of acid, preferably heating the whey to an elevated temperature which is, however, well below the lactalbumin coagulation point, to speed up filtration, adding a filter aid and filtering through a precoated filter press. Perfect clarity of the filtrate is a requisite for best results. We have found pH 4.0–5.2 a suitable range, pH 4.6 being the optimum, and prefer to heat the whey to a temperature in the range 75°–150° F., preferably 140°–150° F. Diatomaceous filter aids of the type of Hyflo Supercel (Johns-Manville) have been found satisfactory. Activated carbon may replace part of the filter aid, but in this case riboflavin is removed from the whey. A small amount of coagulant may be added; examples are activated alumina and ferric chloride.

The amount of filter aid needed will vary somewhat from batch to batch, but will ordinarily be in the range of 0.2%–2.0% of the weight of the whey. The smaller amounts are particularly effective when an additional adsorbent such as activated carbon is used or in the presence of a coagulant. We have had good results using 0.05% activated alumina or using 0.005% ferric chloride, each based on the weight of the whey. In all cases a precoat of filter aid on the filter leaves according to usual practice is desirable; we have found a ⅜ inch precoat satisfactory in commercial-sized batches.

The pretreated whey is then filtered at a rate to yied a clear filtrate; we have found a leaf filter, e. g. a plate-and-frame press, most satisfactory. The clear filtrate is then further heated to a lactalbumin coagulating temperature below the boiling point. Optimum results were obtained by slightly acidifying the filtrate to pH 4.55 before heating, and by heating at 200° ±5° F. for ½ hour. The coagulated lactalbumin is then allowed to settle and the clear supernatant liquid is decanted. The mixture of curd and residual deproteinized whey is filtered and the curd washed in the press with hot water until the filtrate is substantially free of lactose for highest purity lactalbumin; if less pure lactalbumin is acceptable, less water is used in the washing. Alternatively the curd may be washed by decantation before filtration. Instead of a filter press a perforated-basket-type centrifuge provided with a filter cloth may be used. Decantate and filtrate may be further processed for lactose recovery.

It is one advantage of our process that, if the pretreatment of the whey is properly carried out as described, no filter aid is necessary for carrying out a clean and rapid collection of the lactalbumin curd by filtration or centrifugation. The step of separating the filter aid, required in the conventional process, to obtain edible lactalbumin has to our knowledge never been accomplished.

After blowing the filter cake dry with air in the filter press or spinning it dry in the centrifuge, the cake constitutes a moist edible lactalbumin product of high protein and low ash and fat content; it is substantially tasteless and completely devoid of any unpleasant cheesy, fatty or bitter taste.

The moist cake may be further worked up in several ways, but we prefer to slurry it with water, e. g. to about 10% solids content, and dry it to a comminuted solid product. The slurry may, for example, be spray dried, or dried on a top-feed double-roll atmospheric drum drier. The roll dried product may then be broken up or ground to a coarse powder.

Such a product is a white-to-cream-colored nearly tasteless powder of low fat, ash, and moisture content. The latter may be controlled at will, but we prefer to dry to a moisture content of less than 6%. On a dry basis, the analysis of a typical product will show the following range. The impurities content and hence the protein content is dependent on the thoroughness of the washing step.

|  | Per cent |
|---|---|
| Ash | 2.5– 1.0 |
| Fat | 1.5– 0.5 |
| Protein ($N \times 6.67$) | 85 –95+ |
| Lactose | 11 – 3.5 |

All percentages are by weight.

The following example of one embodiment of our invention is intended to be illustrative only and not to limit its scope, which is defined in the appended claims.

*Example*

Eighteen hundred gal. cheese whey is heated to 145° F. and its pH is brought to 4.6 by the addition of 3 gal. muriatic acid. One hundred and sixty lb. "Super Cel" (Johns-Manville) filter aid is suspended in the liquid and the mixture pumped through a plate-and-frame filter press, previously precoated with "Super Cel," at a rate of 4 gal. per sq. ft. filter surface per hour. The filtrate is sparkling clear.

The filtrate is further acidified with a small amount of HCl to pH 4.55 and heated to 204° F. for ½ hour with live steam. After settling, the clear supernatant liquid is drawn off, leaving 300 gal. lactalbumin sludge. The latter is agitated with 300 gal. hot water and filtered without the addition of any filter aid. Filtration is rapid and clean. One hundred and fifty gal. warm water is pumped through the press and air is blown through the press until dry.

The filter cake is suspended in sufficient water to make a 10%-solids suspension. The suspension is spray-dried at a dry bulb mill temperature of 135° F.

The resulting finely powdered product weighs 49.8 lbs. and has the following characteristics:

| Color | White |
|---|---|
| Taste | Nearly tasteless; fatty, cheesy and bitter taste, absent |
| Moisture | 5.55% |
| Dry basis: | |
| Protein ($N \times 6.67$) | 90.70% |
| Fat | .92% |
| Ash | 1.76% |
| Lactose | 6.6% |

From the above description it will be seen that we have devised a process for producing an edible lactalbumin of improved taste by removing from whey certain impurities having objectionable taste characteristics before coagulating the lactalbumin, that we have done this without introducing into the final product any non-comestible material, and that our process is simple and economical and can be carried out in conventional apparatus.

As will be clear to those skilled in the art, certain variations from the precise conditions disclosed above may be introduced into our process without departing from our invention.

We claim:

1. The process of producing edible lactalbumin from whey which comprises: adjusting whey, free of coarsely dispersed casein and fat, to a pH in the range 4.0–5.2, heating the whey to a temperature in the range 75°–150° F., dispersing in the whey 0.2–2.0 percent diatomaceous filter aid based on the weight of the whey, filtering the adjusted mixture containing the filter aid at a rate to yield a clear filtrate, whereby casein-lipid complex is removed from the whey, further heating the filtrate to a temperature in the range 195°–205° F., maintaining it at an elevated temperature for a time sufficient to effect substantially complete coagulation of the lactalbumin, and washing and separating the resulting coagulum of edible lactalbumin without the use of filter aids.

2. The process of claim 1 in which the clear filtrate is adjusted to a pH of 4.55 prior to lactalbumin coagulation.

3. In combination with the process of claim 1, the further steps of slurrying the coagulum in water to form a slurry containing a minor percentage of solids and drying the slurry at a nondestructive temperature to produce an edible solid comminuted lactalbumin product.

4. In a process of recovering lactose from whey in which lactalbumin is coagulated and separately recovered as a by-product, the improvement which consists of coagulating and recovering the lactalbumin in edible form free of objectionable taste by pretreating the whey prior to lactalbumin coagulation, the pretreatment comprising the following steps: adjusting the whey, free of coarsely dispersed casein and fat, to a pH in the range 4.0–5.2, heating the whey to a temperature in the range 75°–150° F., dispersing in the whey 0.2–2.0 percent diatomaceous filter aid based on the weight of the whey, and filtering the adjusted mixture containing the filter aid at a rate to yield a clear filtrate, whereby impurities having objectionable taste characteristics are removed from the whey.

WILLIAM J. PRATT.
FRANK H. TINKLER.

REFERENCES CITED

The following references are of record in the file of this patent:

UNITED STATES PATENTS

| Number | Name | Date |
| --- | --- | --- |
| 2,023,014 | Flanigan et al. | Dec. 3, 1935 |
| 2,181,146 | Peebles et al. | Nov. 28, 1939 |

OTHER REFERENCES

Rogers, Associates of "Fundamentals of Dairy Science," published 1928 by The Chemical Catalog Co. Inc., N. Y. city, pages 59 to 62.

Hunziker, O. F., "Condensed Milk and Milk Powder," published 1946 by the author, La Grange, Illinois, 6th edition, pages 19, 240, 410.